US010902126B2

(12) United States Patent
Sutton et al.

(10) Patent No.: US 10,902,126 B2
(45) Date of Patent: Jan. 26, 2021

(54) VERIFICATION OF A BOOT LOADER PROGRAM AT A CONTROL UNIT TO BE PROVIDED TO A HOST SYSTEM TO LOAD AN OPERATING SYSTEM

(71) Applicant: INTERNATIONAL BUSINESS MACHINES CORPORATION, Armonk, NY (US)

(72) Inventors: Peter G. Sutton, Lagrangeville, NY (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 279 days.

(21) Appl. No.: 15/456,095

(22) Filed: Mar. 10, 2017

(65) Prior Publication Data
US 2018/0260569 A1 Sep. 13, 2018

(51) Int. Cl.
*H04L 29/06* (2006.01)
*G06F 21/57* (2013.01)
(Continued)

(52) U.S. Cl.
CPC .......... *G06F 21/575* (2013.01); *G06F 21/602* (2013.01); *H04L 63/18* (2013.01); *G06F 9/4406* (2013.01)

(58) Field of Classification Search
CPC .... G06F 21/575; G06F 21/602; G06F 9/4406; H04L 63/18
(Continued)

(56) References Cited

U.S. PATENT DOCUMENTS 4,875,155 A * 10/1989 Iskiyan ............... G06F 12/0804
711/113
7,765,393 B1 * 7/2010 Lee ....................... G06F 9/4401
713/2
(Continued)

FOREIGN PATENT DOCUMENTS

WO     2004025484     3/2004

OTHER PUBLICATIONS

Y. Wen, "Secure Web Authentication Against Deceiving URLs and Compromised Root Certificate Authorities", ip.com, IP.com No. IPCOM000244917D, Jan. 29, 2016, pp. 9.
(Continued)

*Primary Examiner* — Michael S McNally
(74) *Attorney, Agent, or Firm* — David W. Victor; Konrad Raynes Davda & Victor LLP

(57) ABSTRACT

Provided are a computer program product, system, and method for verification of a boot loader program at a control unit to be provided to a host system to load an operating system. A stored value is generated from a cryptographic function applied to portions of a boot loader program stored in the storage. The boot loader program is read from the storage in response to execution of a boot loader request from the host system. The cryptographic function is applied to at least a portion of the read boot loader program to produce a calculated value. The host system is provided access to the boot loader program to use to load the operating system from the storage into the host system in response to the calculated value matching the stored value.

24 Claims, 5 Drawing Sheets

(51) Int. Cl.
*G06F 21/60* (2013.01)
*G06F 9/4401* (2018.01)

(58) Field of Classification Search
USPC .............................. 707/752, 753; 713/182
See application file for complete search history.

(56) References Cited

U.S. PATENT DOCUMENTS

| | | | |
|---|---|---|---|
| 9,286,459 B2 | 3/2016 | Hogg et al. | |
| 9,805,199 B2* | 10/2017 | Gschwind | G06F 9/4408 |
| 2010/0011200 A1* | 1/2010 | Rosenan | G06F 21/575 |
| | | | 713/2 |
| 2012/0265976 A1* | 10/2012 | Spiers | H04L 63/0218 |
| | | | 713/2 |
| 2016/0232356 A1* | 8/2016 | Barkelew | G06F 21/572 |
| 2016/0267275 A1* | 9/2016 | Gschwind | G06F 9/4408 |
| 2017/0147356 A1* | 5/2017 | Kotary | G06F 21/575 |
| 2017/0323104 A1* | 11/2017 | Gschwind | G06F 9/4408 |
| 2018/0032734 A1* | 2/2018 | Gunti | G06F 21/575 |

OTHER PUBLICATIONS

"Channel I/O", Wikipedia, [online][retrieved Jan. 26, 2017] https://en.wikipedia.org/w/index.php?title=Channel_I/O&printable=yes, pp. 4.

"Honeypot (computing)", Wikipedia, [online][retrieved Jan. 26, 2017] https://en.wikipedia.org/wiki/Honeypot_(computing), pp. 3.

"IODF processing at IPL", [online][retrieved Jan. 22, 2017] https://www.ibm.com/support/knowledgecenter/en/SSLTBW_2.1.0/com . . . , pp. 2.

S. Sasso, "z/OS MVS System Initialization Logic Initial Program Load (IPL)", IBM Corporation, Version 2, Jul. 2014, pp. 49.

"Secure Boot", [online][retrieved Jan. 6, 2017] https://msdn.microsoft.com/windows/hardware/commercialize/manufactu . . . , pp. 2.

* cited by examiner

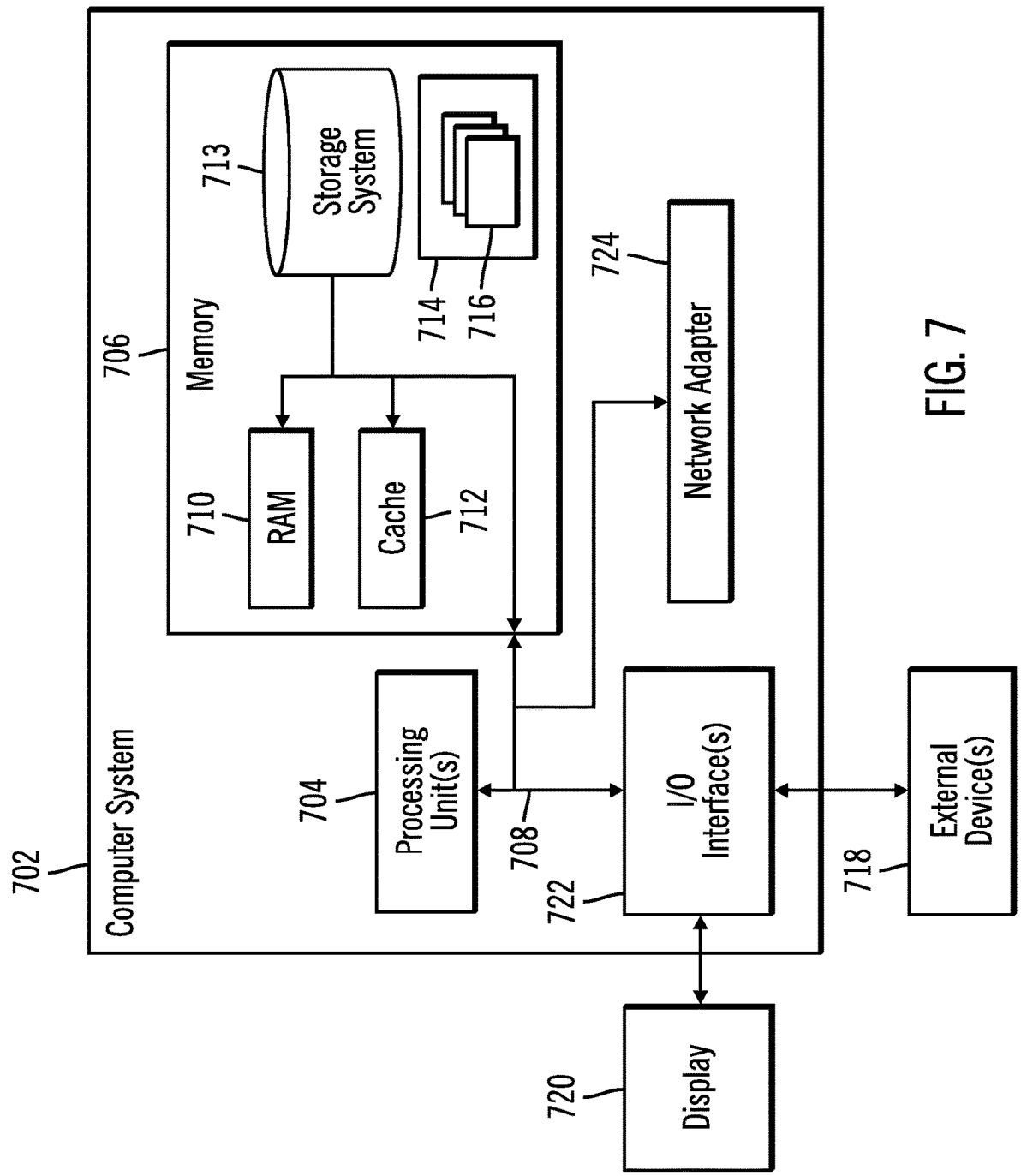

VERIFICATION OF A BOOT LOADER PROGRAM AT A CONTROL UNIT TO BE PROVIDED TO A HOST SYSTEM TO LOAD AN OPERATING SYSTEM

BACKGROUND OF THE INVENTION

1. Field of the Invention

The present invention relates to a computer program product, system, and method for verification of a boot loader program at a control unit to be provided to a host system to load an operating system.

2. Description of the Related Art

A boot loader program is a program executed during startup or initialization that loads the operating system into the computer to run. In certain situations, the boot loader program may become compromised with malicious code that can install a rootkit in the operating system. The rootkit may run in the operating system to allow malicious or unintended access to the computer system and even take full control over the system to destructive ends. The rootkit may be difficult to detect because the rootkit may subvert detection methods, and the rootkit may be difficult to remove when it resides in the kernel of the operating system.

To avoid loading malicious code when loading the operating system, the Basic Input Operating System (BIOS) of the computer system to run the boot loader program may calculate a hash, such as a signature or fingerprint, from the boot loader program and compare to a stored hash value in the BIOS firmware to determine whether the boot loader program has been modified, possibly with malicious code. If the calculated and stored hash values do not match, then the boot loader may not be invoked to load the operating system.

There is a need in the art for improved techniques for validating the boot loader program for different types of operating systems.

SUMMARY

Provided are a computer program product, system, and method for verification of a boot loader program at a control unit to be provided to a host system to load an operating system. A stored value is generated from a cryptographic function applied to portions of a boot loader program stored in the storage. The boot loader program is read from the storage in response to execution of a boot loader request from the host system. The cryptographic function is applied to at least a portion of the read boot loader program to produce a calculated value. The host system is provided access to the boot loader program to use to load the operating system from the storage into the host system in response to the calculated value matching the stored value.

With the described embodiments, the boot loader program is validated in a control unit separate from the host system that would use the boot loader program to load an operating system, by the control unit using stored values, which may be maintained in a cryptographic storage for further protection from tampering. Described embodiments avoids risks associated with malicious code becoming embedded in a host boot loader by having the boot loader maintained in a separate storage managed by a control unit and having the control unit check whether the boot loader has been infected by malicious code using a stored value. If the boot loader verifies the boot loader program has not been compromised, then the boot loader is provided to host systems to use to load an operating system from the storage. This further allows for centralized verification of the boot loader program before being distributed to host systems in the network.

In further embodiments, an operating system request from the boot loader program executing in the host system for the operating system is received and the operating system from the storage is returned to the host system in response to the operating system request.

With the described embodiments, the operating system is returned to the verified boot loader that was provided to the host system to use to request the operating system. This ensures that only the boot loader that has been verified by the control unit may access and load the operating system.

In yet further embodiments, the boot loader request comprises a first command to read a first record from the storage that results in reading at least one additional command to read at least one additional record from the storage to result in reading the boot loader program. The cryptographic function is applied to at least one of the first record, the at least one additional record, and the portion of the boot loader program to produce the calculated value.

With the additional embodiments, the cryptographic function is applied not only to the boot loader program but also to a valid first and at least one additional command and at least one record read by the commands. This further verifies not just that the boot loader has not changed but that the correct commands were sent and correct records read to request and access the boot loader program from the control unit.

In further embodiments, the control unit and host system communicate over a network. A message is transmitted to an additional system external to the host system and control unit using an out-of-band connection separate from the network indicating that the calculated value did not match the stored value to provide an alert of possible malicious code running at the host system.

With the further embodiments, the control unit uses the out-of-band connection separate from the network to provide the alert of possible malicious code to avoid using a channel that may be monitored by the malicious code in the boot loader program. The malicious code may be monitoring the primary network used by the host system. In this way, the malicious code in the boot loader program is not made aware that it has been detected, and the malicious activities may be monitored and controlled without an entity behind the malicious code being alerted that it is being tracked and monitored.

In further embodiments, the host system is provided access to the boot loader program in response to the calculated value not matching the stored value. The boot loader program provided to the host system is associated with a honeypot operating system in the storage intended to monitor malicious code running in the host system. In response to receiving an operating system load request from the boot loader program provided to the host system, the host system is provided access to the honeypot operating system in response to the boot loader program provided to the host system being associated with the honeypot operating system.

With the further embodiments, upon detecting that the boot loader program is likely infected with malicious code, the boot loader program is allowed to continue operations and load an operating system, but is instead provided a honeypot operating system to load. The honeypot operating system operates to isolate, detect, deflect, monitor and counteract attempts by the potentially malicious boot loader program to engage in harmful and destructive computing activity in the host system. The honeypot operating system may comprise a full-fledged production system to monitor any malicious activities, engage in deception activities, and trap the malicious code to determine its source.

BRIEF DESCRIPTION OF THE DRAWINGS

FIG. 7 illustrates a computing environment in which the components of FIG. 1 may be implemented.

DETAILED DESCRIPTION

In enterprise storage servers, host systems may load the operating system by first loading a boot loader program, such as an Initial Program Load (IPL), from a control unit over a network, such as a Storage Area Network (SAN). Multiple host systems may access their boot loader program in storage managed by the control unit over the network to execute and load the operating system from the storage managed by the control unit.

Described embodiments provide techniques to allow a control unit to verify that the boot loader program, such as the IPL program, does not include malicious code independent of the host system requesting the boot loader program. Having the control unit validate the boot loader before making available to the host systems prevents loading a compromised operating system. Further, having the control unit perform the validation avoids the risk of a specific host boot loader being modified with malicious code, such as a root kit. The control unit may maintain the hash codes used to validate the boot loader program in firmware that is difficult to change or may not be changed, such as cryptographically protected, thus preventing malicious tampering of the hash codes to cause the control unit to validate a compromised boot loader program and return to the host system.

Figure 1:
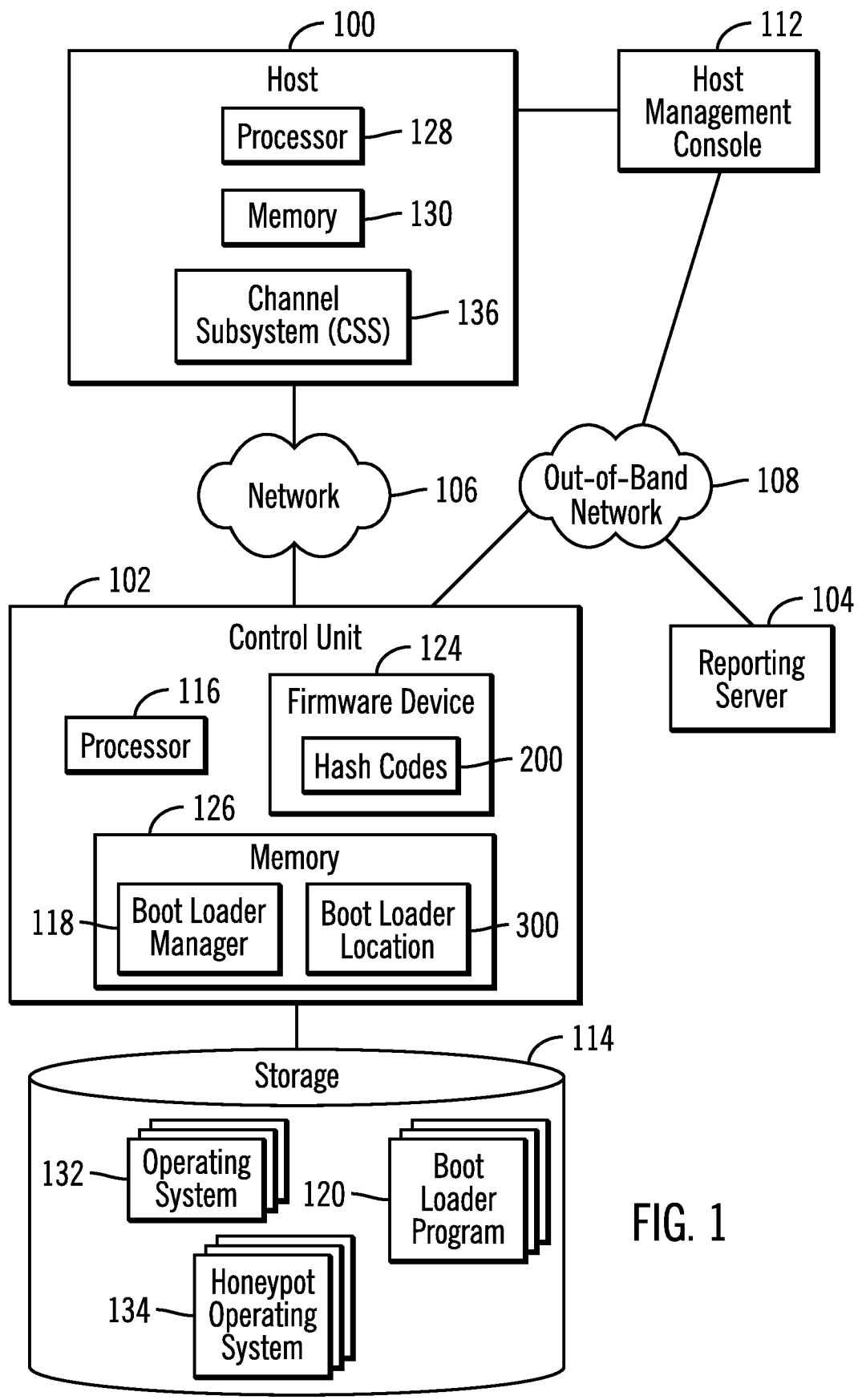
FIG. 1 illustrates an embodiment of a computing environment.

FIG. 1 illustrates an embodiment of a computing environment having a host system 100, a control unit 102, and a reporting server 104 to which results on the control unit 102 verifying a boot loader may be reported. The host 100 and control unit 102 may communicate over a network 106, such as a Storage Area Network (SAN) or other type network. The control unit 102 may also use an out-of-band network 108, separate from the network, to communicate with the reporting server 104 and/or a host management console (HMC) 112 for the host 100. A host management console 112 may comprise a separate computer system operated by a person to send load and other commands to the host 100.

The control unit 102 manages access to a storage 114 and includes a processor 116 to execute a boot loader manager 118 in a control unit memory 126, which handles requests from hosts 100 to access a boot loader program 120 and operating system 132 in the storage 114. A user at the host management console 112 may send a load command to the host 100 to retrieve the boot loader program 120 at an address in the storage 114 to initiate the process.

The boot loader manager 118 utilizes hash codes 200, or other cryptographic codes, in a firmware device 124, such as a read only memory (ROM) or other cryptographically protected device, which are installed during manufacture of the control unit 102, to verify that the boot loader program 120, such as the Initial Program Load (IPL) in a Z Systems Operating System (z/OS), to return has not been modified, possibly with malicious code. With respect to FIG. 1, the boot loader manager 118 may load the requested boot loader program 120 into a boot loader location 300 in the memory 126 of the control 102 unit to perform the hash code 200 verification operation. In certain embodiments, the firmware device 124 may comprise a secure mechanism to prevent the hash codes 200 from being modified so that malicious boot loader code could be validated. In certain embodiments, the firmware device 124 may comprise a secure cryptoprocessor, such as a Trusted Platform Module (TPM), that is cryptographically protected from unauthorized modifications.

Once the requested boot loader program 120 is returned to the host 100, the host 100 processor 128 executes the returned boot loader program 120 in a host memory 130 to request the control unit 102 to load an operating system 132 from the storage 114 over the network 106, such as a SAN. The storage 114 also includes honeypot operating systems 134 to return to the host 100 if the boot loader manager 118 determines that there is a possibility the boot loader program 120 requested by the host 100 includes malicious code. The honeypot operating system 134 includes code and mechanisms to isolate, detect, deflect, monitor and counteract attempts by the potentially malicious boot loader program 120 to engage in harmful and destructive computing activity in the host 100 and network to which the host 100 is connected. The honeypot operating system 134 may comprise a full-fledged production system to monitor any malicious activities, engage in deception activities, and trap the malicious code to determine its source.

In certain embodiments, the host 100 may further include a channel subsystem (CSS) 136 to communicate with the control unit 102.

The host 100 may be a server or a virtual computing system in a host machine. The control unit 102 may comprise a server suitable for managing access to attached storage devices, such as the International Business Machine Corporation's ("IBM") DS8000® storage system. (DS8000 is a registered trademark of IBM in countries throughout the world). The operating systems 132 may comprise different types of operating systems, such as Z Systems Operating System (z/OS®) from International Business Machines Corporation ("IBM") or other operating systems known in the art, e.g., Microsoft Windows® operating system, Linux® operating system, etc. (z/OS is a registered trademark of IBM throughout the world, (Windows is a registered trademark of Microsoft Corporation; and LINUX is a registered trademark of Linus Torvald).

The separate networks 106 and 108 may comprise a Storage Area Network (SAN), Local Area Network (LAN), Intranet, the Internet, Wide Area Network (WAN), peer-to-peer network, wireless network, arbitrated loop network, etc. In certain embodiments, the control unit 102 may communicate with the host management console 112 over the out-of-band network 108 so that the communications may not be intercepted by malicious code running in the host 100.

The storage 114 may comprise one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices comprising the storages 116a, 116b may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

Figure 2:
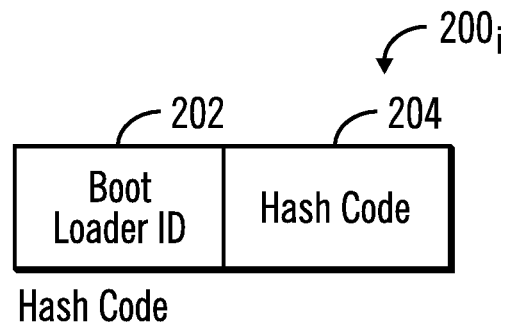
FIG. 2 illustrates an embodiment of a hash code instance.

FIG. 2 illustrates an embodiment of an instance of a hash code 200, included in the hash codes 200, having a boot loader identifier (ID) 202 and the hash code 204 calculated from the boot loader program 120 identified by the boot loader ID 202. There may be a hash code 200, for each boot loader 120/operating system 132 pair, where different hosts may require different boot loader programs 120 to load different operating systems 132. There may be multiple hash code instances 200, having multiple possible hash codes 204 and boot loader IDs 202 as the different operating systems and versions may have different loaders (e.g., z/OS, z/VM, Linux, TPF, Stand-alone Dump, ICKDSS, etc.). The hash codes 200 may comprise other types of cryptographic hash codes or functions used to establish that the boot loader program 120 is unmodified.

Figure 3:
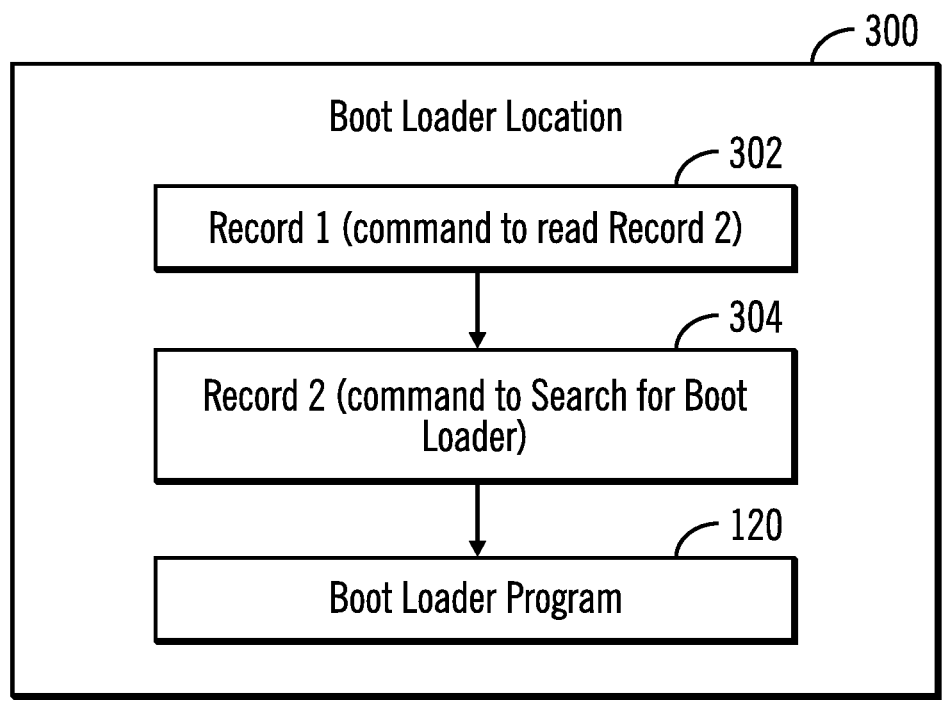
FIG. 3 illustrates an embodiment of a boot loader location in a control unit memory.

FIG. 3 illustrates an embodiment of the boot loader location 300 in the control unit memory 126 in which the boot loader program 120 and other related information are loaded in order to return the boot loader program 120 to a host 100 request. In one embodiment, a boot loader request from a host 100 may include a read request to initiate reading a chain of records 302, 304 that comprise a series of commands, each including a further command that when executed in sequence result in reading the boot loader program 120 into the boot loader location 300 in the control unit memory 126. In one embodiment, the received host boot loader request would read a first record 302 into the boot loader location 300, which includes a command that when next executed reads a second record 304 into the boot loader location 300, which includes a next read command that when executed searches for and loads the requested boot loader program 120 into the boot loader location 300. If the hash is good (match in the storage system), the hash may be sent to the host via the IPL read command, such as the IPL read command x02 for Z System Operating System, to load into the host memory 130.

Figure 4:
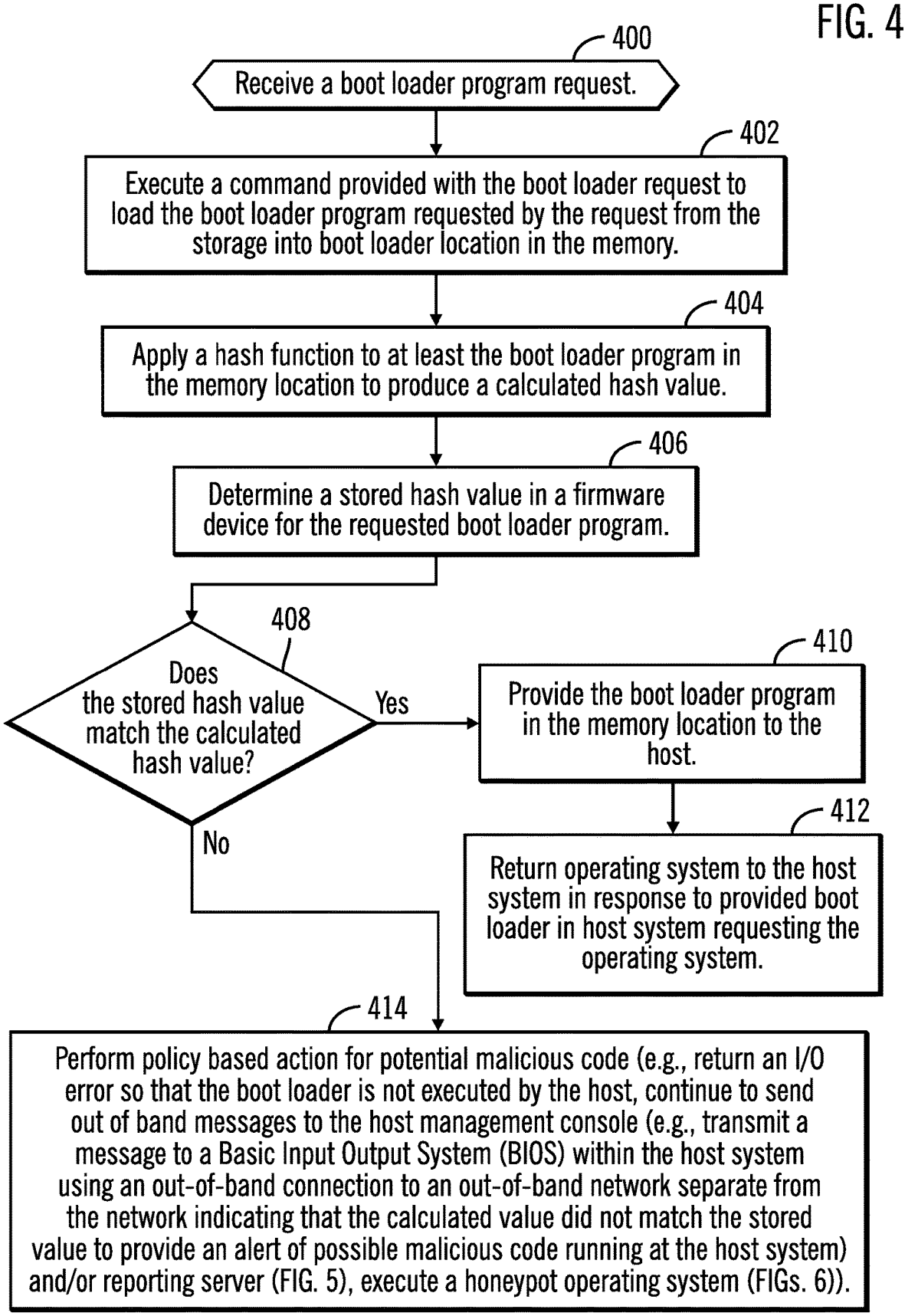
FIG. 4 illustrates an embodiment of operations to validate a boot loader program in a control unit requested by a host to use to load an operating system through the control unit.

FIG. 4 illustrates an embodiment of operations performed by the boot loader manager 118 to determine whether to return a boot loader program 120 to a request from a host 100. Upon receiving (at block 400) a boot loader request, the boot loader manager 118 executes (at block 402) a command provided with the boot loader request to load the boot loader program 120 requested by the request from the storage into the boot loader location 300 in the memory 126. In one embodiment, the boot loader request from the host 100, which may be sent in response to input from the host management console 112, may comprise a command the boot loader program 120 executes to read a first record 302 from the storage 114, which includes a command causing the boot loader manager 118 to read a second record 304, which includes a further command the boot loader manager 118 executes to load the boot loader program 120 into the boot loader location 300.

After the boot loader program 120 is located in the memory 126, the boot loader manager 118 applies (at block 404) a hash function, or other type of cryptographic function, to some or all of the read boot loader program 120 to produce a calculated hash or other cryptographic value. In a further embodiment, the hash function may be applied to some or all of the read records 302, 304 as well as some or all of the boot loader program 120 to produce the calculated hash value. The hash function applied at block 404 may comprise the same hash function, such as a fingerprint or signature method, applied to generate the hash codes 204. The boot loader manager 118 determines (at block 406) the stored hash value 204 in the firmware 124 for the requested boot loader 202. If (at block 408) the stored hash value 206 matches the calculated hash value, then the boot loader manager 118 provides (at block 410) the boot loader program 120 in the boot loader location 300 in the memory 126 to the host 100 over the network 106. The operating system 132 is returned (at block 412) to the host 100 in response to the provided boot loader program 120 executed in the host 100 requesting the operating system 132.

If (at block 408) the stored hash 204 and calculated hash values do not match, then a policy based action is performed (at block 414) to handle potentially malicious code in the boot loader program 120 that could be injected into the operating system 132 when executing in the host memory 130 by the host processor 128.

In one embodiment, the policy based action performed at block 414 may comprise the boot loader manager 118 not returning the boot loader program 120 and instead throwing an exception and isolating the boot loader program 120 as having potentially malicious code to be available for further inspection and analysis by an administrator. Other possible policy actions include, but are not limited to, return an I/O error so that the boot loader is not executed by the host 100, continue to send out-of-band messages to the host management console 112 (e.g., transmit a message to a Basic Input Output System (BIOS) within the host system using an out-of-band connection to an out-of-band network separate from the network indicating that the calculated value did not match the stored value to provide an alert of possible malicious code running at the host system) and/or reporting server 104 (FIG. 5), return a honeypot operating system 134 (FIG. 6), etc.

Figure 5:
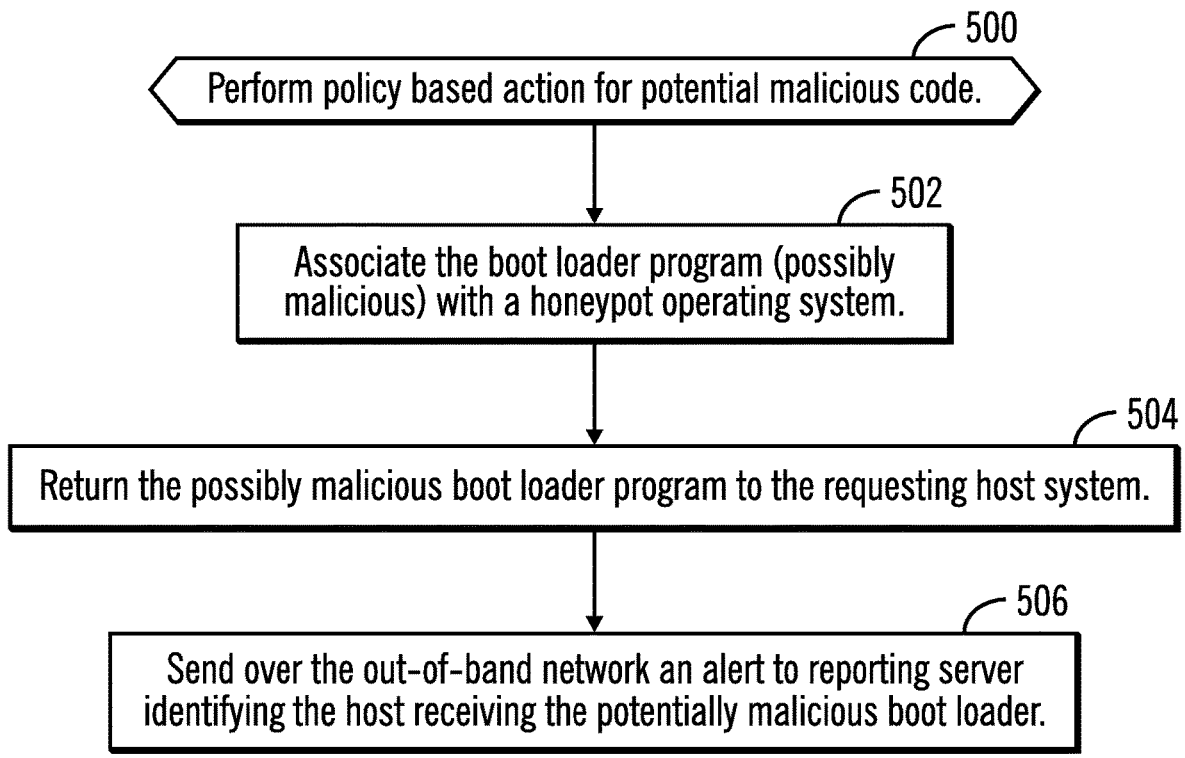
FIG. 5 illustrates an embodiment of operations to perform a policy based action if possible malicious code is detected in the boot loader program.

FIG. 5 illustrates an embodiment of operations performed by the boot loader manager 118 in response to performing a policy based action for potential malicious code at block 414 in FIG. 4. Upon initiating (at block 500) the policy based action for the potentially malicious code in the boot loader program, the boot loader manager 118 associates (at block 502) the boot loader program 120 having the potentially malicious code with a honeypot operating system 134. The potentially malicious boot loader program 120 is returned (at block 504) to the requesting host 100. The boot loader manager 118 may further send (at block 506) over the out-of-band network 108 an alert to the reporting server 104, or the host management console 112 identifying the host receiving the potentially malicious boot loader 120 to allow an administrator to take further action and be aware of the possible infection.

Figure 6:
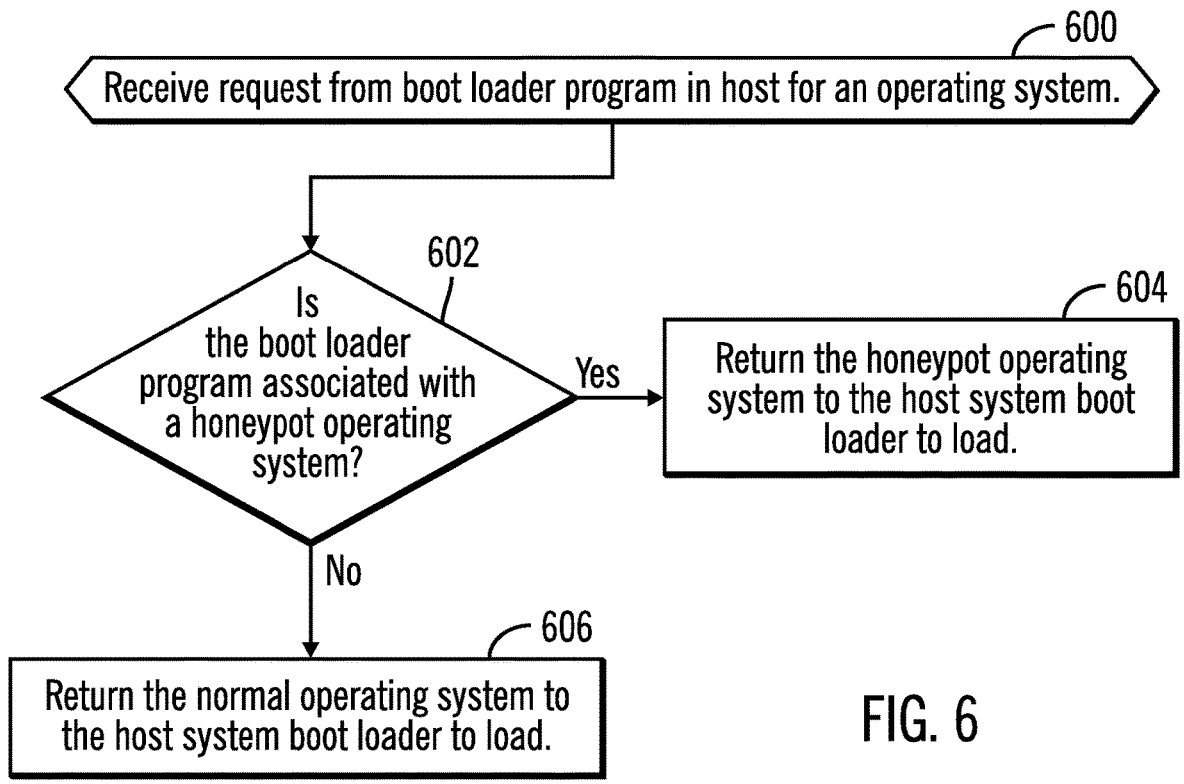
FIG. 6 illustrates an embodiment of operations to handle a request from the boot loader program executing in the host to load the operating system.

FIG. 6 illustrates an embodiment of operations performed by the boot loader manager 118 to process a request from the boot loader program 120 executing in the host 100 for the operating system 132. Upon receiving a request for the boot loader program 120 from the host 100, if (at block 602) the requested boot loader program 120 is indicated as having potentially malicious code, then the boot loader manager 118 returns the honeypot operating system 134 to the host 100 to run, which would prevent harmful actions resulting from malicious code embedded in the boot loader program 120. If (at block 602) the boot loader program 120 is not associated with the honeypot operating 134, and instead associated with the normal operating system 132, then the normal operating system 132 is returned to the host 100.

In one embodiment, the operation at block 502 to associate the boot loader program 120 with the malicious code may involve updating a table which would indicate whether each of the boot loader programs 120 are to use the regular operating system 132 or a honeypot operating system 134. Alternatively, the boot loader manager 118 may perform the association at block 502 by replace the operating system 132 at the location in the storage 114 with the honeypot operating system 134 so that when the possibly malicious boot loader program 120 requests the operating system at the storage 114 address, the honeypot operating system 134 now at that location in the storage 114 would be returned. Other techniques to switch to providing the honeypot operating system 134 to the malicious boot loader program 120 may be used.

In the embodiment of FIG. 4, the boot loader manager 118 executes the initial read command to perform reading a chain of records 302, 304 and the boot loader program 120. In an alternative embodiment, the host may communicate with the control unit 102 through a channel subsystem 136 in the host 100 that implements channels to handle host 100 communication with the control unit 102 and storage 114, where the channel subsystem 136 executes I/O commands from the host directed to the control unit 102 and storage through channels dedicated to executing control unit 102 I/O commands. In such channel subsystem 136 embodiments, the boot loader program 120 may comprise an Initial Program Load (IPL) program to load an operating system. The channel subsystem 136 provides a separate hardware channel, including separate processor, to communicate with the control unit 102, and would execute a channel program comprising a series of channel command words (CCWs) to read the records 302 and 304 into the boot loader location 300 and to read in the boot loader program 300, where the records 302 and 304 include further CCWs for the channel to execute to load in the boot loader program 120. If the channel subsystem 136 reads in the records 302 and 304, which may also go to the host memory 130 as a result of executing the IPL, and executes the commands therein to successfully load the boot loader program 120 into the boot loader location 300 in the control unit 102 memory 126, then the boot loader manager 118 may perform the hash function check using the hash code 200, for the boot loader program 120 to validate the boot loader program 120 to ensure no malicious code has been inserted into the boot loader program 120 while stored in the storage 114.

For instance, the host command to the channel subsystem 136 may cause the channel dedicated to the control unit 102 to execute the host command and the at least one additional command in the records 302 304 to read the at least one first record 302, the at least one additional record 304, and the boot loader program 120 into the memory 126 of the control unit. The control unit performs the applying the hash function and providing the host system access to the initial program load code in response to the calculated hash value matching the stored hash value.

In such channel subsystem 136 embodiments, when the IPL Read Command completes to read in the records 302 and 304, normal ending I/O status is signaled to the channel subsystem 136 signaling that the IPL routine (boot loader) has been read in without error. The channel subsystem 136 then sets the Program Status Word (PSW) to point to location 0 in the host 100 memory 130. Location 0 is where the boot loader 120 is read into. Setting the PSW in the host memory 130 starts the execution of the boot loader. The host system uses the program status word (PSW) in the memory 130 to branch to and execute the boot loader program 120 to load the operating system 132 from the storage 114.

The described embodiments provide techniques for a host to access a boot loader program from a control unit over a network, and have the control unit perform the validation operation to determine whether the requested boot loader program potentially contains malicious code, such as a rootkit, and then take an appropriate policy based action upon making such a determination.

In certain embodiments, the boot loader manager 118 running in the control unit 102 may validate the boot loader program 120 in addition to validation operations performed at the host management console 112. This double validation provides added protection in the event the hash codes in the firmware device 124 are compromised.

The reference characters used herein, such as i, used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the host 100, the control unit 102, and the reporting server 104 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712.

Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for validating a boot loader program in a storage for a host system, wherein the computer program product comprises a computer readable storage medium having program instructions embodied therewith that when executed causes operations, the operations comprising:
   maintaining a stored value generated from a cryptographic function applied to portions of a boot loader program stored in the storage, wherein the boot loader program executes in the host system to load an operating system into the host system;
   reading the boot loader program from the storage in response to execution of a boot loader request from the host system;
   applying the cryptographic function to at least a portion of the boot loader program read from the storage to produce a calculated value;
   providing the host system access to the boot loader program over a network to use to load the operating system from the storage into the host system in response to the calculated value matching the stored value; and
   transmitting a message to a Basic Input Output System (BIOS) within the host system, using an out-of-band connection to an out-of-band network separate from the network, indicating an alert of possible malicious code running at the host system in response to the calculated value not matching the stored value.

2. The computer program product of claim 1, wherein the operations further comprise:
receiving an operating system request from the boot loader program executing in the host system for the operating system; and
returning the operating system from the storage to the host system in response to the operating system request.

3. The computer program product of claim 1, wherein the boot loader request comprises a first command to read a first record from the storage that results in reading at least one additional command to read at least one additional record from the storage to result in reading the boot loader program, and wherein the applying the cryptographic function comprises applying the cryptographic function additionally to at least one of the first record and the at least one additional record to produce the calculated value.

4. The computer program product of claim 3, wherein the first command invokes a channel program executed by a channel subsystem providing a channel to the host system, wherein the channel subsystem executes the first command and the at least one additional command to read the at least one of the first record, the at least one additional record, and the boot loader program into a memory.

5. The computer program product of claim 4, wherein the operations further comprise:
setting, by the channel subsystem, a program status word to point to a location in a host memory where the boot loader program is loaded, wherein the setting the program status word indicates that the calculated value matches the stored value and starts execution of the boot loader program.

6. The computer program product of claim 3, wherein the operations further comprise:
receiving the first command; and
executing the first command and the at least one additional command to read the boot loader program into a memory.

7. The computer program product of claim 6, wherein the executing the first command causes executing a chain of commands to read a chain of records to read into the memory, wherein each of the chain of records prior to a last record of the chain of records includes a next command to execute, wherein the last record in the chain of records read into the memory in response to execution of the chain of commands comprises the boot loader program, wherein the cryptographic function is additionally applied to one of the records read into the memory to produce the calculated value.

8. The computer program product of claim 1, wherein a plurality of values are maintained for different boot loader programs for different operating systems stored in the storage, wherein the boot loader request specifies one of the boot loader programs to load an operating system associated with the specified boot loader program.

9. The computer program product of claim 1, wherein the operations further comprise:
transmitting a message to an additional system external to the host system using the out-of-band connection to the out-of-band network separate from the network indicating that the calculated value did not match the stored value to provide an alert of possible malicious code running at the host system.

10. The computer program product of claim 1, wherein the operations further comprise:
providing the host system access to the boot loader program in response to the calculated value not matching the stored value;
associating the boot loader program provided to the host system with a honeypot operating system in the storage intended to monitor malicious code running in the host system;
receiving an operating system load request from the boot loader program provided to the host system; and
providing the host system access to the honeypot operating system in response to the boot loader program provided to the host system being associated with the honeypot operating system.

11. The computer program product of claim 1, wherein the cryptographic function comprises a hash function, the stored value comprises a stored hash value, and the calculated value comprises a calculated hash value.

12. A system for validating a boot loader program in communication with a host system over a network and an out-of-band network, comprising:
a processor;
a storage storing an operating system and a boot loader program to execute in the host system to load the operating system into the host system;
a firmware device storing a stored value generated from a cryptographic function applied to portions of the boot loader program stored; and
a computer readable storage medium having program instructions executed by the processor to cause operations, the operations comprising:
reading the boot loader program from the storage in response to execution of a boot loader request from the host system;
applying the cryptographic function to at least a portion of the boot loader program read from the storage to produce a calculated value;
providing the host system access to the boot loader program to use to load the operating system from the storage into the host system in response to the calculated value matching the stored value; and
transmitting a message to a Basic Input Output System (BIOS) within the host system, using the out-of-band network separate from the network, indicating an alert of possible malicious code running at the host system in response to the calculated value not matching the stored value.

13. The system of claim 12, wherein the operations further comprise:
receiving an operating system request from the boot loader program executing in the host system for the operating system; and
returning the operating system from the storage to the host system in response to the operating system request.

14. The system of claim 12, wherein the boot loader request comprises a first command to read a first record from the storage that results in reading at least one additional command to read at least one additional record from the storage to result in reading the boot loader program, and wherein the applying the cryptographic function comprises applying the cryptographic function additionally to at least one of the first record and the at least one additional record to produce the calculated value.

15. The system of claim 14, wherein the operations further comprise:
receiving the first command; and
executing the first command and the at least one additional command to read the boot loader program into a memory.

16. The system of claim 15, wherein the executing the first command causes executing a chain of commands to read a chain of records to read into the memory, wherein each of the chain of records prior to a last record of the chain of records includes a next command to execute, wherein the last record of records read into the memory in response to execution of the chain of commands comprises the boot loader program, wherein the cryptographic function is additionally applied to one of the records read into the memory to produce the calculated value.

17. The system of claim 12, wherein the operations further comprise:
transmitting a message to an additional system external to the host system and the system using an out-of-band connection to the out-of-band network separate from the network indicating that the calculated value did not match the stored value to provide an alert of possible malicious code running at the host system.

18. The system of claim 12, wherein the operations further comprise:
providing the host system access to the boot loader program in response to the calculated value not matching the stored value;
associating the boot loader program provided to the host system with a honeypot operating system in the storage intended to monitor malicious code running in the host system;
receiving an operating system load request from the boot loader program provided to the host system; and
providing the host system access to the honeypot operating system in response to the boot loader program provided to the host system being associated with the honeypot operating system.

19. A method for validating a boot loader program, comprising:
maintaining a stored value generated from a cryptographic function applied to portions of a boot loader program stored in a storage, wherein the boot loader program executes in a host system to load an operating system into a host system, wherein the host system is accessible over a network;
reading the boot loader program from the storage in response to execution of a boot loader request from the host system;
applying the cryptographic function to at least a portion of the boot loader program read from the storage to produce a calculated value;
providing the host system access to the boot loader program to use to load the operating system from the storage into the host system in response to the calculated value matching the stored value; and
transmitting a message to a Basic Input Output System (BIOS) within the host system, using an out-of-band connection to an out-of-band network separate from the network, indicating an alert of possible malicious code running at the host system in response to the calculated value not matching the stored value.

20. The method of claim 19, further comprising:
receiving an operating system request from the boot loader program executing in the host system for the operating system; and
returning the operating system from the storage to the host system in response to the operating system request.

21. The method of claim 19, wherein the boot loader request comprises a first command to read a first record from the storage that results in reading at least one additional command to read at least one additional record from the storage to result in reading the boot loader program, and wherein the applying the cryptographic function comprises applying the cryptographic function additionally to at least one of the first record and the at least one additional record to produce the calculated value.

22. The method of claim 21, further comprising:
receiving the first command; and
executing the first command and the at least one additional command to read the boot loader program into a control unit memory.

23. The method of claim 19, further comprising:
transmitting a message to an additional system external to the host system using the out-of-band connection separate from the network indicating that the calculated value did not match the stored value to provide an alert of possible malicious code running at the host system.

24. The method of claim 19, further comprising:
providing the host system access to the boot loader program in response to the calculated value not matching the stored value;
associating the boot loader program provided to the host system with a honeypot operating system in the storage intended to monitor malicious code running in the host system;
receiving an operating system load request from the boot loader program provided to the host system; and
providing the host system access to the honeypot operating system in response to the boot loader program provided to the host system being associated with the honeypot operating system.

* * * * *